United States Patent
Saito et al.

(10) Patent No.: US 8,918,880 B2
(45) Date of Patent: Dec. 23, 2014

(54) PLANT SECURITY MANAGING DEVICE, MANAGING METHOD AND MANAGING PROGRAM

(71) Applicants: Keishin Saito, Shinjuku (JP); Hiroshi Inada, Mitaka (JP); Takahiro Mori, Hodogaya-ku (JP)

(72) Inventors: Keishin Saito, Shinjuku (JP); Hiroshi Inada, Mitaka (JP); Takahiro Mori, Hodogaya-ku (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 207 days.

(21) Appl. No.: 13/720,214

(22) Filed: Dec. 19, 2012

(65) Prior Publication Data

US 2013/0179976 A1    Jul. 11, 2013

(30) Foreign Application Priority Data

Dec. 26, 2011   (JP) .................................. 2011-284564

(51) Int. Cl.
*G06F 21/00*     (2013.01)
*G06F 21/56*     (2013.01)

(52) U.S. Cl.
CPC .............. G06F 21/561 (2013.01); G06F 21/56 (2013.01)
USPC ................ 726/24; 726/22; 726/23; 713/189; 713/190; 713/191; 713/192; 713/193

(58) Field of Classification Search
CPC .............................. G06F 21/561; G06F 21/56
See application file for complete search history.

(56) References Cited

U.S. PATENT DOCUMENTS

2009/0254642 A1*  10/2009  Geist ............................ 709/222
2010/0043073 A1*   2/2010  Kuwamura ..................... 726/24

FOREIGN PATENT DOCUMENTS

| JP | 10-283015 | 10/1998 |
| JP | 2007-293519 | 11/2007 |
| JP | 2008-242679 | 10/2008 |
| JP | 2010-44613 | 2/2010 |
| JP | 2010-97471 | 4/2010 |
| WO | WO 2008/146408 | 12/2008 |

OTHER PUBLICATIONS

Japanese Office Action issued May 13, 2014, in Japan Patent Application No. 2011-284564.

* cited by examiner

*Primary Examiner* — Ghazal Shehni
(74) *Attorney, Agent, or Firm* — Oblon, Spivak, McClelland, Maier & Neustadt, L.L.P.

(57) ABSTRACT

A technology is provided which ensures a high security without affecting a plant operation. A plant security managing device includes a determining unit that determines which one of control units multiplexed as a service system and a standby system associated with monitoring and controlling of a plant is the standby system, a security processing unit that performs a security process for detecting the presence/absence of a security abnormality on the control unit that is the standby system, and a change instructing unit that outputs an instruction for changing the control unit that is the standby system and the control unit that is the service system with each other after the completion of the security process by the security processing unit.

9 Claims, 15 Drawing Sheets

PLANT SECURITY MANAGING DEVICE, MANAGING METHOD AND MANAGING PROGRAM

CROSS-REFERENCE TO RELATED APPLICATION

This application is based upon and claims the benefit of priority from Japanese Patent Application No. 2011-284564, filed Dec. 26, 2011; the entire contents of which are incorporated herein by reference.

FIELD

Embodiments of the present invention relates generally to plant security managing device, managing method, and managing program that enhance security measures in a plant monitoring-controlling system.

BACKGROUND

Plants, such as a power generation plant, a steel plant, and a chemical plant, are controlled by a plant monitoring-controlling system that controls various facilities in each plant. Such a plant monitoring-controlling system includes a plant control device and an operating-monitoring device, etc.

The plant control device controls control targets. The operating-monitoring device operates and monitors the control target through the plant control device. The plant control device and the operating-monitoring device respectively run software for control as well as software for operation and monitoring on an operating system.

The plant control device and the operation-monitoring device are connected to a network in order to transmit/receive control and operating-monitoring signals.

In such plant monitoring-controlling system, conventionally, an operating system, software for control, and software for operation and monitoring which are developed by individual manufacturer are used. Moreover, an exclusive network for signal transmission/reception is used. Hence, a risk like a virus attack from the exterior is little.

Nowadays, there is a tendency that a large number of systems use general-purpose hardware, software and network from the standpoint of the cost reduction and the easiness of installation and maintenance.

Because of the same reason, in a plant monitoring-controlling system, there is also a tendency that a personal computer in which a general-purpose operating system has been installed is used as the plant control device and the operating-monitoring device. Moreover, a public line network is utilized as the network in some cases.

In this case, however, the possibility that devious programs such as computer virus enter through the network or the USB port, etc., of the personal computer increases.

In order to address such a disadvantage, it is possible to run a general-purpose antivirus software to periodically check the presence/absence of a virus infection. When, however, such antivirus software is being run, the load factor of a CPU increases. Hence, the operation of the operating system, software for the control, and software for operation and monitoring may become slow.

In particular, a plant subjected to a control highly needs to keep operating for long years. Accordingly, a delay or a termination of an operation due to an external cause must be avoided as much as possible.

Embodiments of the present invention have been proposed in order to address the above-explained disadvantages, and it is an object to provide a technology that can ensure a high security without affecting a plant operation.

In order to accomplish the above object, a plant security managing device according to the embodiments of the present invention has following technical features:

(1) a determining unit that determines which one of elements multiplexed as a service system and a standby system associated with monitoring and controlling of a plant is the standby system;

(2) a security processing unit that performs a security process only on the element that is the standby system; and (3) a change instructing unit that outputs an instruction for changing the standby-system element and the service-system element with each other.

The embodiments of the present invention can be deemed as a method for realizing respective functions of the above-explained units by a computer or an electronic circuit, and a program run by a computer.

DETAILED DESCRIPTION

[A. First Embodiment]
[1. Configuration]
[Plant Monitoring-Controlling System]

Figure 1:
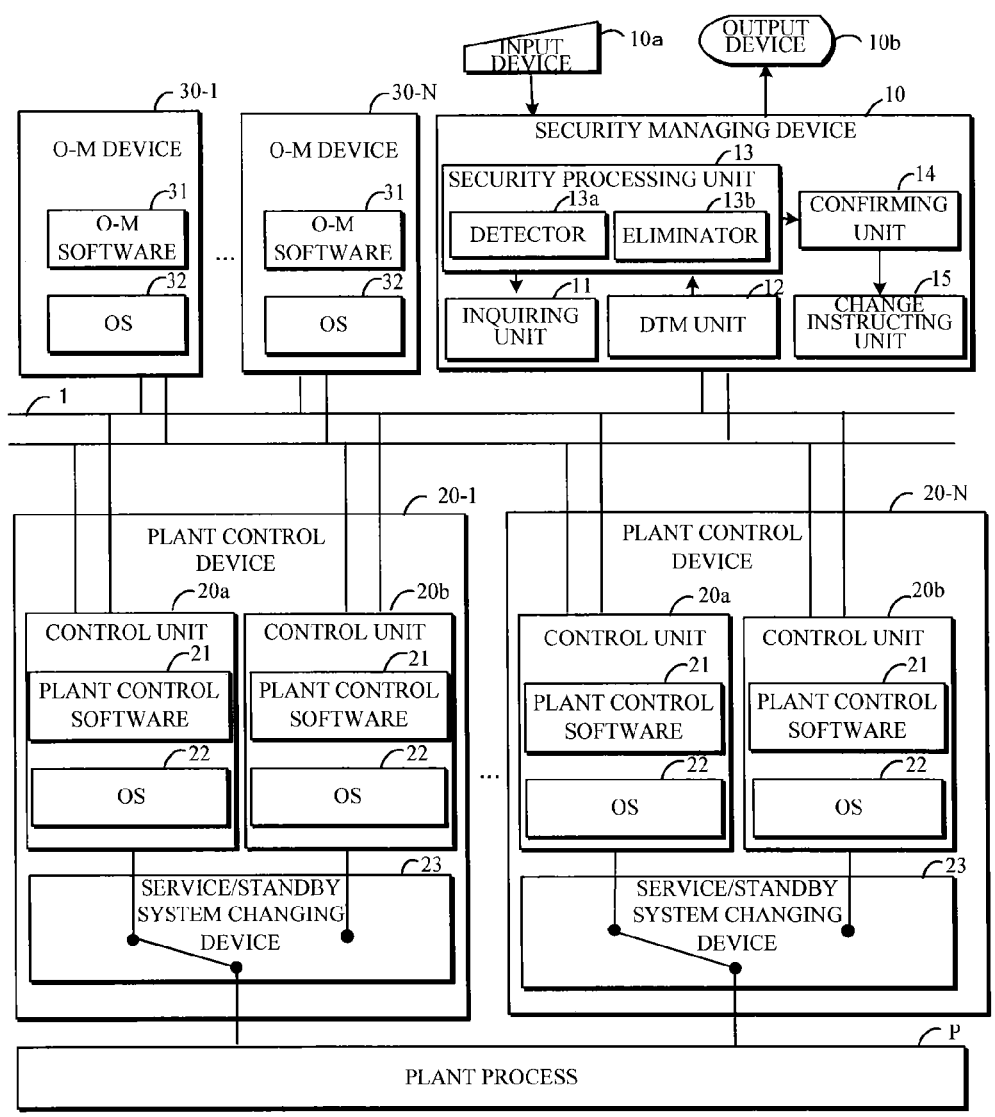
FIG. 1 is a block diagram illustrating an example configuration according to a first embodiment.

First, an explanation will be given on a plant monitoring-controlling system S to which a security managing device according to this embodiment is applied with reference to FIG. 1. The plant monitoring-controlling system S monitors and controls a plant process P.

The plant process P is a collection of control targets like various facilities constructing a plant subjected to be controlled and parameters and pieces of data indicating respective operation statuses of such control targets, and includes devices that collect, store, calculate, and output such parameters and pieces of data.

The plant monitoring-controlling system S includes a plurality of plant control devices 20-1 to 20-N, and a plurality of operating-monitoring devices (O-M DEVICE) 30-1 to 30-N as devices associated with a plant monitoring and controlling. In the following explanation, when an explanation will be simply given of the plant control device or the operating-monitoring device, such a device will be mentioned as the plant control device(s) 20 or the controlling-monitoring device(s) 30.

The plant control devices 20, and the operating-monitoring devices 30 are connected to a network 1. Hence, the plant control devices 20 and the operating-monitoring devices 30 are capable of transmitting/receiving control signals and operating-monitoring signals through the network 1.

The plant control devices 20 control the plant process P. The plant control devices 20 include a pair of control units 20a and 20b, and a service/standby system changing device 23 as multiplex elements associated with a plant monitoring-control. The two control units 20a and 20b are, for example, computers having CPUs independent from each other. A plant control software 21 and an operating system 22 (indicated as OS in the figure) are installed in each of the control units 20a and 20b. The control units 20a and 20b activate the plant control software 21 over respective operating systems 22, thereby controlling the plant process P.

The service/standby system changing device 23 changes the device that controls the plant process P to either one of the control units 20a and 20b. Hence, the plant monitoring-controlling system S has a redundancy in the control for the plant process P. The term "service" means that it is actually used for controlling the plant process P. Accordingly, it can be also expressed as "currently used" in the meaning of a current use. Moreover, the term "standby" means that it is not actually used for the control of the plant process P but is in a status operable to control such a plant process when changed to the "service" status.

It is optional that which one of the control units 20a and 20b is changed to the "service" status to set such unit to be a service system, and is changed to the "standby" status to set such unit to be a standby system. When, for example, the one control unit 20a that is a service system breaks down, it is possible to change another control unit 20b from the standby system to the service system. According to this embodiment, for a security process to be discussed later, the service system and the standby system are changed.

The operating-monitoring devices 30 operate and monitor the plant process P through the plant control devices 20. The operating-monitoring devices 30 include operating-monitoring software 31 and an operating system 32, respectively. The operating-monitoring devices 30 activate the operating-monitoring software (O-M Software) 31 on the operating system 32. Hence, the operating-monitoring devices 30 transmit an operating instruction to the plant control devices 20 and monitor the status thereof, etc.

It is not illustrated in the figure but the plant control devices 20 and the operating-monitoring devices 30 include an input unit, an output unit, and a memory unit, respectively. The input unit is a processing unit that inputs necessary information for a process by the device, and inputs process selection and instruction. The output unit is a processing unit like a display device that outputs information which is a target for each process in a manner recognizable by a user such as an operator. The memory unit is a processing unit that stores various pieces of information necessary for a process.

[Security Managing Device]

Next, an explanation will be given on a security managing device 10 according to this embodiment. The security managing device 10 executes a security process for the plant control devices 20. The security managing device 10 is connected to the network 1. The security managing device 10 includes an inquiring unit 11, a determining unit (DTM unit) 12, a security processing unit 13, a confirming unit 14, and a change instructing unit 15.

The inquiring unit 11 is a processing unit that inquires, through a standby-system inquiring signal, the service/standby system changing device 23 which one of the control units 20a and 20b in the plant control device 20 is the standby system. The determining unit 12 is a processing unit that determines which one of the control units 20a and 20b is the standby system through a standby-system device communication signal from the service/standby system changing device 23. Determination on the standby system includes an indirect determination process based on a determination which one of the control units 20a and 20b is the service system. The same is true of a determination on the standby system in the following embodiments.

The security processing unit 13 is a processing unit that performs a security process on the control unit 20a or the control unit 20b determined as the standby system through the network 1 to address a security abnormality. The security processing unit 13 includes, for example, a detector 13a that detects an abnormality and an eliminator 13b that eliminates an abnormality when such an abnormality is detected.

A process of detecting an abnormality includes, for example, a virus scan or a virus check. A process of eliminating the abnormality includes, for example, a process of cleaning, removing or isolating a detected virus.

The abnormality includes entrance and infection of a devious program so-called malware such as a spyware. Moreover, the abnormality includes a fraudulent access from the exterior and an access to the fraudulent site from the interior.

The confirming unit 14 is a processing unit that confirms the completion of the security process by the security processing unit 13. The change instructing unit 15 is a processing unit that transmits a service/standby changing instruction to the service/standby system changing device 23, thereby changing the control units 20a and 20b between the service system and the standby system.

[Input Device]

The above-explained security managing device 10 is connected with an input device 10a that inputs necessary information for a process by each unit and inputs process selection and instruction. The input device 10a includes all input devices available presently or in future, such as a keyboard, and a mouse.

[Output Device]

The security managing device 10 includes an output device 10b that outputs information which is a process target of each unit in a manner recognizable by the user. The output device 10b includes all output devices available presently or in future, such as a display device, and a printer.

[Memory Device]

It is not illustrated in the figure but the security managing device 10 includes a memory device that stores various pieces of information necessary for a process by each unit. When, for example, information for determining the standby system like a standby-system device communication signal is received, the memory device stores such information. Moreover, when information for determining a loading factor is received, the memory device stores such information. The memory device also stores a result of the security process.

The memory device further stores information relating to various settings, such as a computing equation, parameters, and thresholds. The memory area for individual information in the memory device can be regarded as the memory unit for individual information. Those pieces of information can be input by the user through the input device 10a. The memory device includes all memory media available presently or in future.

The above-explained plant control devices 20, the operating-monitoring devices 30, and the security managing device 10 can be implemented by controlling a computer through a predetermined program. Examples of such a computer are a general-purpose computer and a server device. Moreover, the plant control software 21, the operating-monitoring software 31, and the operating systems 22 and 32 that are programs can be implemented by a general-purpose software.

In this case, the program physically utilizes the hardware resources of the computer to implement the process by each of the above-explained units. Setting of the process range by the hardware and the process range by the software including such program is not limited to any particular condition.

[2. Action]

Figure 2:
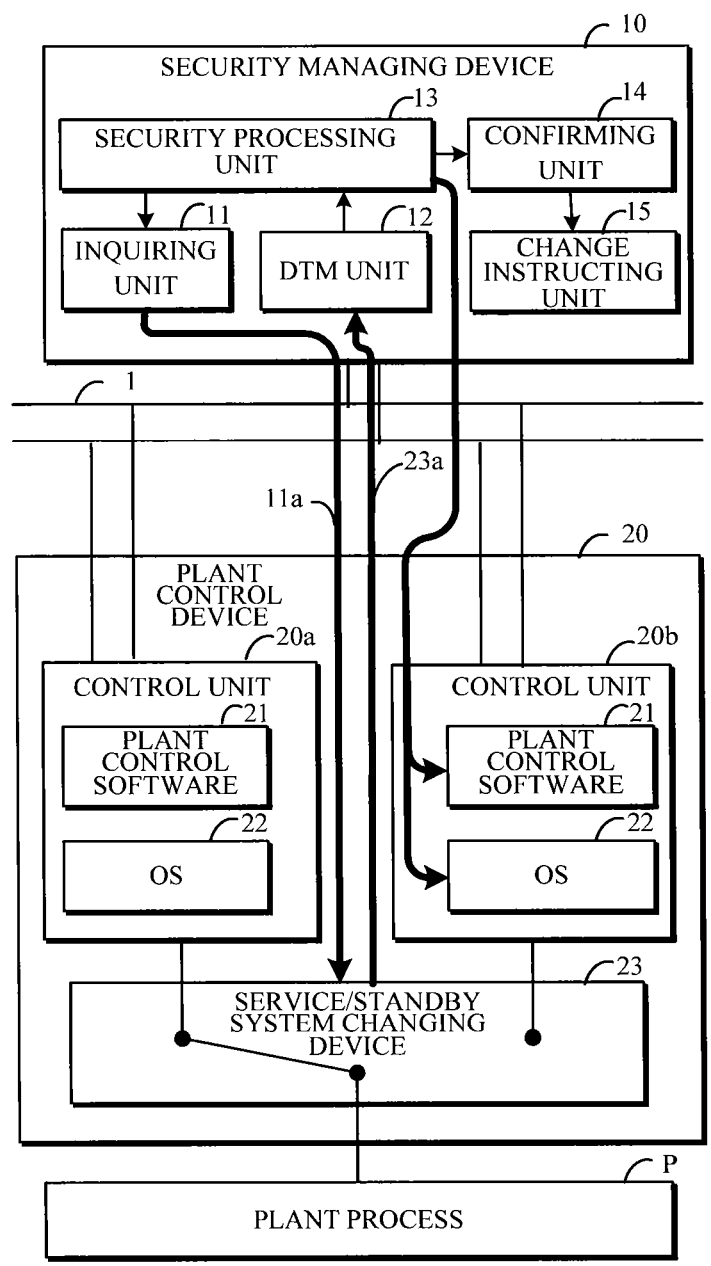
FIG. 2 is a diagram illustrating a flow of a signal before a service/standby status is changed in FIG. 1.
Figure 3:
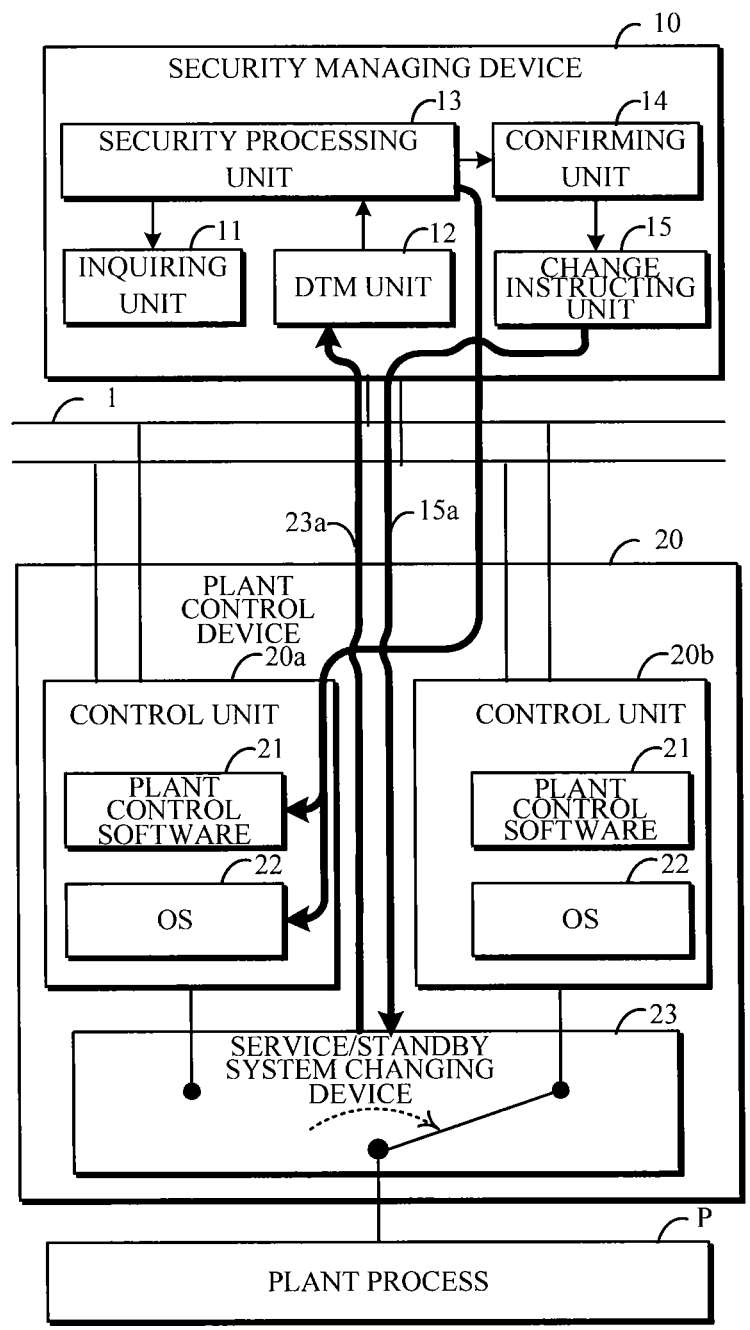
FIG. 3 is a diagram illustrating a flow of a signal after the service/standby status is changed in FIG. 1.
Figure 4:
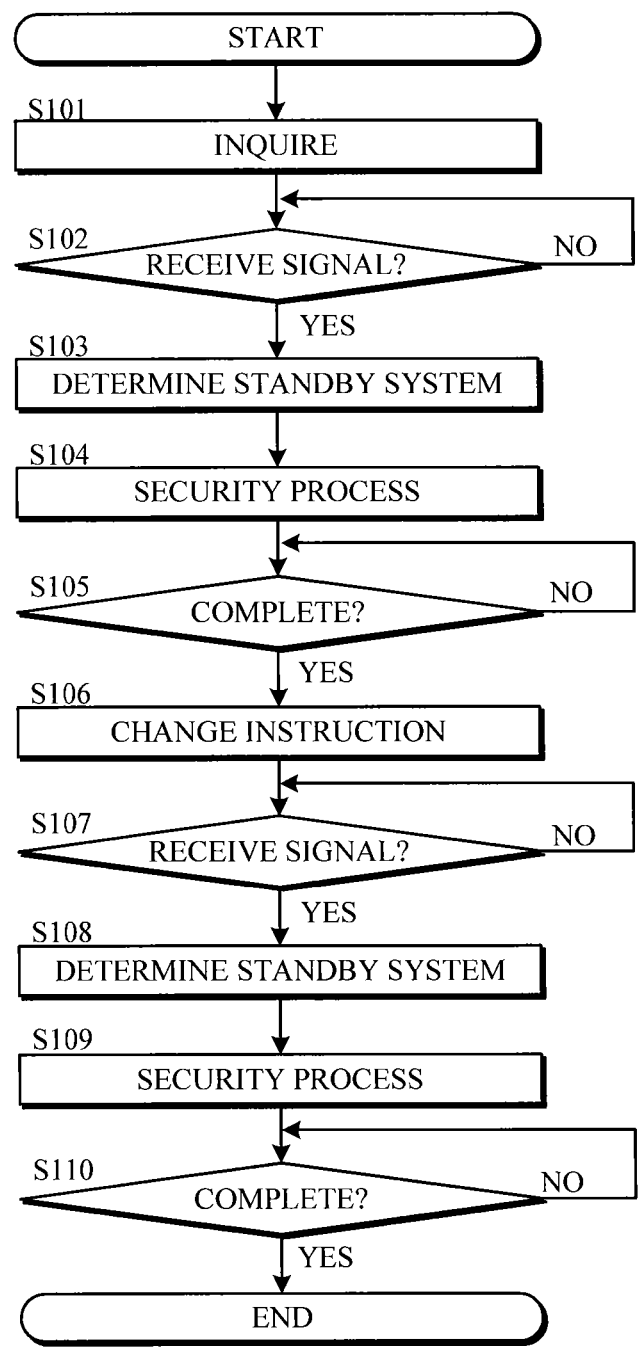
FIG. 4 is a flowchart illustrating a process flow according to the first embodiment.

The security process according to the above-explained embodiment will now be explained with reference to FIGS. 2 to 4. FIGS. 2 and 3 are configuration diagram illustrating only necessary portions for indicating the flow of a signal. FIG. 4 is a flowchart illustrating a process flow by the security managing device 10. A method, a program and a recording medium storing the program of executing a process to be discussed later by each unit are also within the embodiment of the present invention.

First, the inquiring unit 11 in the security managing device 10 inquires through the network 1 which one of the control units 20a and 20b is currently the standby system (step S101). This inquiring process is, as illustrated in FIG. 2, executed by the inquiring unit 11 that transmits a standby-system inquiring signal 11a to the service/standby system changing device 23. The security managing device 10 waits a reply to this inquiry (step S102: NO).

The service/standby system changing device 23 replies to the inquiry which one of the control units 20a and 20b is currently the standby system through the network 1. A reply process is executed by the service/standby system changing device 23 that transmits a standby-system device communication signal 23a to the security managing device 10. In the following explanation, it is presumed as an example case that the control unit 20b is currently the standby system and the control unit 20a is the service system.

In the security managing device 10 that has received the standby-system device communication signal 23a (step S102: YES), the determining unit 12 refers to the standby-system device communication signal 23a, and determines that the control unit 20b is the standby system (step S103).

The security processing unit 13 performs the security process on the control unit 20b that is the standby system based on the determination result by the determining unit 12 (step S104). For example, the detector 13a in the security processing unit 13 performs virus check on the plant control software 21 and the operating system 22 in the control unit 20b through the network 1. When a virus is found, the eliminator 13b cleans the virus.

The confirming unit 14 waits the completion of the security process by the security processing unit 13 (step S105: NO). When the confirming unit 14 confirms the completion (step S105: YES), the change instructing unit 15 instruct a change between the service system and the standby system (step S106). This instructing process is, as illustrated in FIG. 3, executed by the change instructing unit 15 that transmits a service/standby changing instruction 15a to the service/standby system changing device 23. The security managing device 10 waits a communication to this changing instruction (step S107: NO).

In this case, the service/standby system changing device 23 changes the status of the control unit 20a and the control unit 20b between the service system and the standby system. For example, the service/standby system changing device 23 changes the control unit 20a that is currently the service system to be the standby system, and changes the control unit 20b that is currently the standby system to be the service system. At this time, the service/standby system changing device 23 transmits the standby-system device communication signal 23a to the security managing device 10.

In the security managing device 10 that has received the standby-system device communication signal 23a (step S107: YES), the determining unit 12 refers to the standby-system device communication signal 23a, and determines that the control unit 20a is the standby system now (step S108).

The security processing unit 13 performs, through the network 1, the security process on the control unit 20a changed to the standby system based on the determination result by the determining unit 12 (step S109).

The confirming unit 14 waits the completion of the security process by the security processing unit 13 (step S110: NO). When the confirming unit 14 confirms the completion (step S110: YES), the security process is terminated. It is needless to say that the security process can be performed at a timing stored in the memory device or in accordance with an instruction input by the user through the input device 10a.

[3. Advantage]

According to the above-explained embodiment, only when the control unit 20a or 20b is the standby system that does not currently control the plant process P, the security process is performed. Hence, when the control unit 20a or 20b is controlling the plant process P, no security process is performed.

Accordingly, the load of the control unit 20a or 20b controlling the plant process P does not increase, and thus a delay or a termination of respective operations of the plant control software 21 and the operating system 22 can be suppressed. That is, the operation of the plant can be continued stably.

A security can be ensured by simply disconnecting a device causing a security problem from the network 1 or by performing an access control. In this case, however, the continuation of the operation of the plant becomes difficult. This embodiment has a remarkable advantage that the necessary operation can be continued in the plant as explained above.

When, a simple virus check, etc., is performed on an operating device, the load thereof increases, resulting in a delay in the operation. According to this embodiment, only when the control unit 20a or 20b is in the standby status, the security process is performed. Accordingly, it does not affect the operation of the plant. The load can be reduced in comparison with, for example, a case in which a redundancy in a device is accomplished by virtualization.

[B. Second Embodiment]

[1. Configuration]

Figure 5:
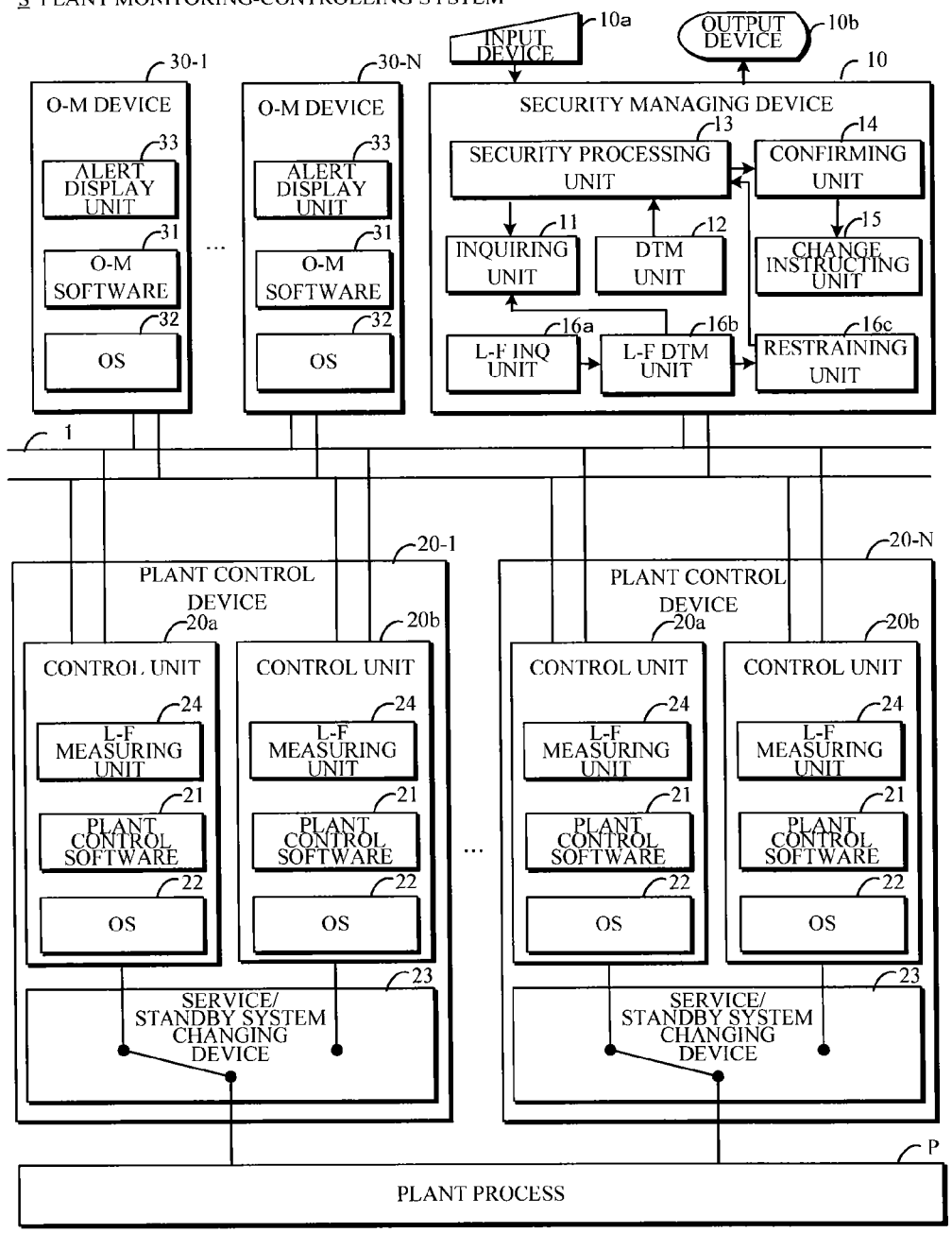
FIG. 5 is a block diagram illustrating an example configuration according to a second embodiment.

An explanation will now be given of a configuration according to this embodiment with reference to FIG. 5. The same configuration as that of the first embodiment will be denoted by the same reference numeral, and the duplicated explanation will be omitted.

The control units 20a and 20b in the plant control device 20 are provided with a loading-factor measuring unit (L-F MEA- SURING UNIT) 24. The loading-factor measuring unit 24 is a processing unit that measures the loading factor of the CPU in the control unit 20*a* or 20*b*.

The security managing device 10 includes a loading-factor inquiring unit (L-F INQ UNIT) 16*a*, a loading-factor determining unit (L-F DTM UNIT) 16*b*, and a restraining unit 16*c*. The loading-factor inquiring unit 16*a* is a processing unit that inquires a loading factor to the loading-factor measuring unit 24. The loading-factor determining unit 16*b* is a processing unit that determines whether or not the loading factor obtained from the loading-factor measuring unit 24 exceeds a predetermined threshold. The threshold is stored in advance in the memory device.

The restraining unit 16*c* is a processing unit that restrains the security process by the security processing unit 13 when the loading-factor determining unit 16 determines that the loading factor exceeds the threshold.

[2. Action]

Figure 6:
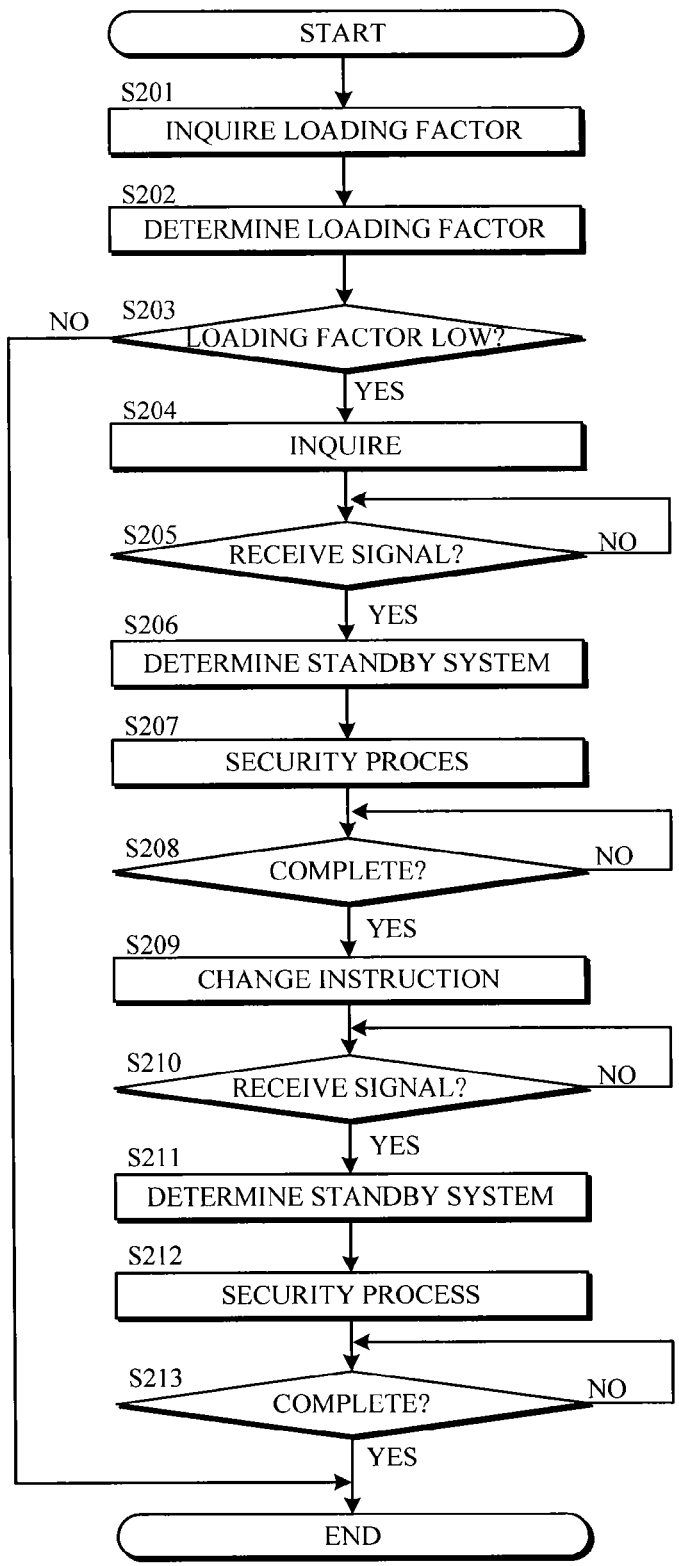
FIG. 6 is a flowchart illustrating a process flow according to the second embodiment.

A flow of the process according to this embodiment employing the above-explained configuration will be explained with reference to the flowchart of FIG. 6. First, it is presumed that the control unit 20*a* is currently the service system. In this case, the loading-factor measuring unit 24 of the control unit 20*a* that is the service system measures the loading factor of the control unit 20*a*.

Next, the loading-factor inquiring unit 16*a* in the security managing device 10 inquires the loading factor to the loading-factor measuring unit 24 in the control unit 20*a* through the network 1 (step S201). The loading-factor measuring unit 24 transmits data of the loading factor of the control unit 20*a* to the security managing device 10.

In the security managing device 10 that has received the data of the loading factor, the loading-factor determining unit 16*b* determines whether or not the loading factor exceeds the predetermined threshold (step S202).

When the loading-factor determining unit 16*b* determines that the loading factor is equal to or lower than the predetermined threshold (step S203: YES), it can be determined that the plant is stable. Hence, like the above-explained embodiment, the security process is performed in this case (steps S204 to S213).

When the loading-factor determining unit 16*b* determines that the loading factor exceeds the predetermined threshold (step S203: NO), it can be determined that the plant is unstable. Hence, the restraining unit 16*c* restrains the security process by the security processing unit 13. Accordingly, no security process is performed and the process is terminated.

[3. Advantage]

According to this embodiment, before the flow of the security process begins, it is determined whether or not to perform the security process in accordance with the loading factor. Hence, a negative exertion to the control to the control unit 20*a* or 20*b* to which a high load is applied due to the changing process for the security process can be suppressed.

[C. Third Embodiment]

[1. Configuration]

Figure 7:
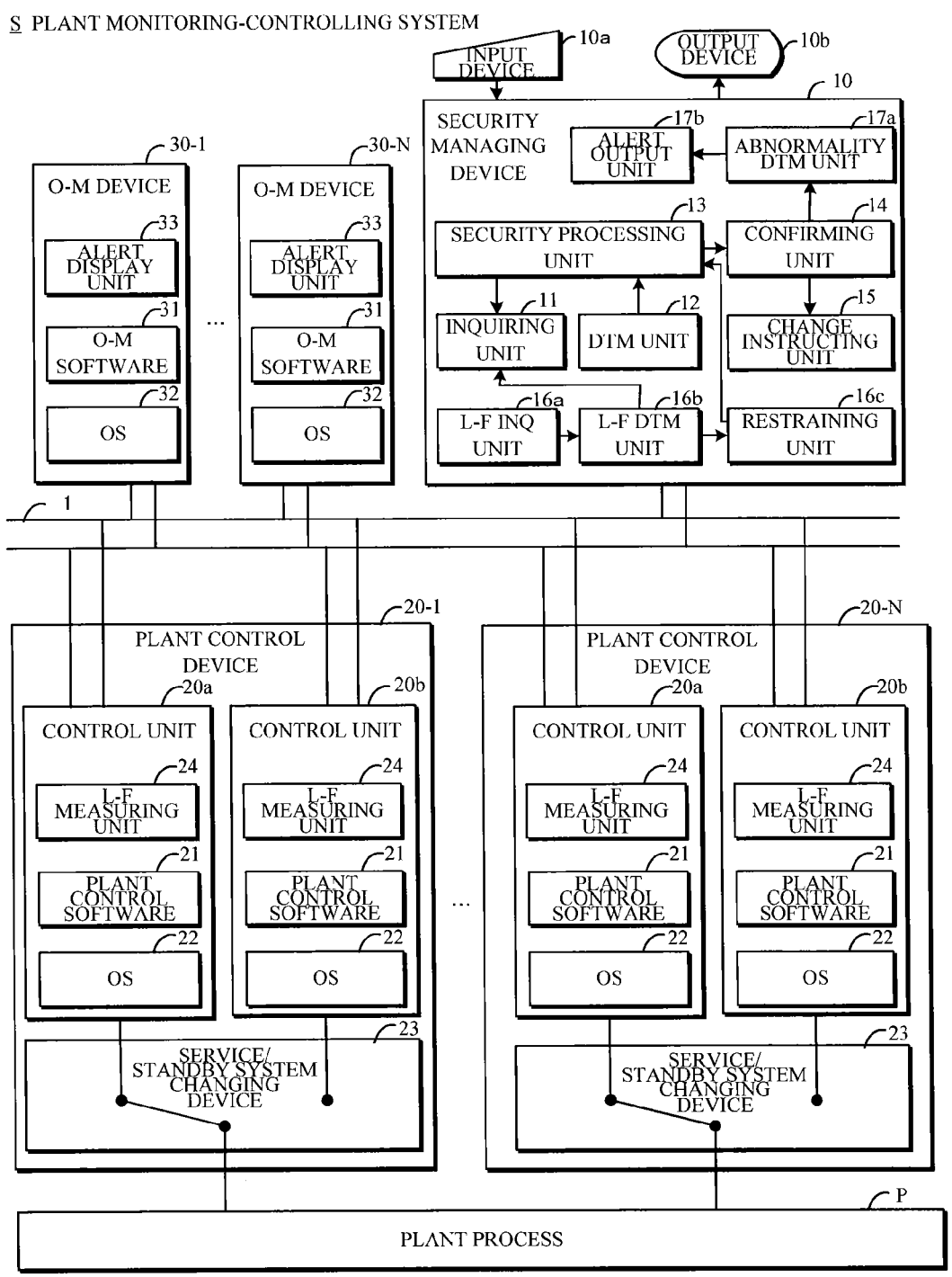
FIG. 7 is a block diagram illustrating an example configuration according to a third embodiment.

A configuration according to this embodiment will be explained with reference to FIG. 7. The same configuration as those of the first and second embodiments will be denoted by the same reference numeral, and the duplicated explanation will be omitted. First of all, the operating-monitoring device 30 includes an alert displaying unit 33. The alert displaying unit 33 is a processing unit that displays an alert output by the security managing device 10. For example, the alert displaying unit 33 can be configured by an output unit of the operating-monitoring device 30.

The security managing device 10 includes an abnormality determining unit (ABNORMALITY DTM UNIT) 17*a* and an alert output unit 17*b*. The abnormality determining unit 17*a* is a processing unit that determines, after the completion of the security process by the security processing unit 13, whether or not an abnormality is found through the security process. When, for example, a virus is found by the security processing unit 13, the abnormality determining unit 17*a* determines that an abnormality is found.

The alert output unit 17*b* is a processing unit that outputs an alert to the operating-monitoring device 30 and the output device 10*b* when the abnormality determining unit 17*a* determines that an abnormality is found. For example, a screen of the alert displaying unit 33 of the operating-monitoring device 30 and that of the output device 10*b* can display a screen to the effect that a virus is found.

[2. Action]

Figure 8:
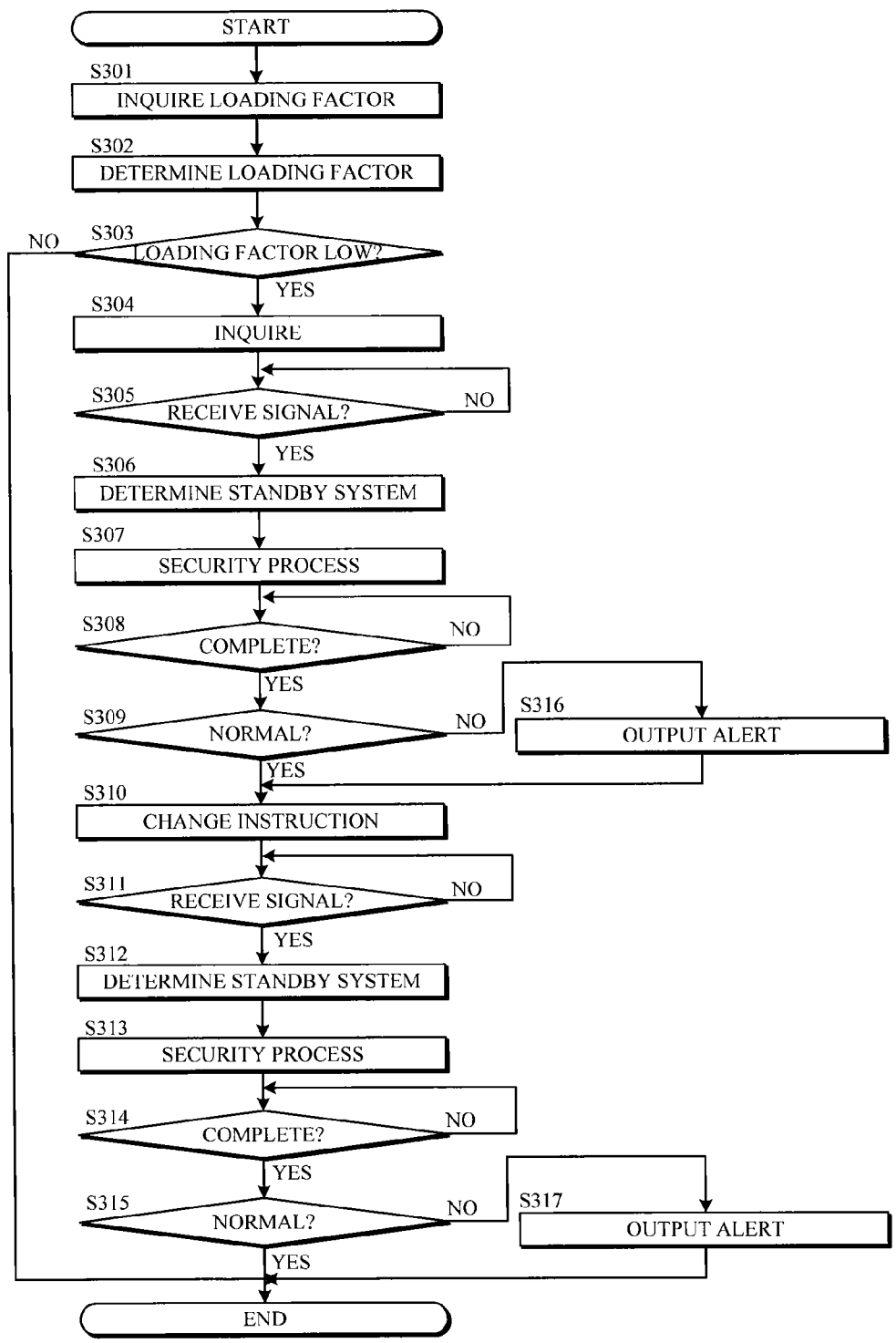
FIG. 8 is a flowchart illustrating a process flow according to the third embodiment.

A flow of the process according to this embodiment employing the above-explained configuration will now be explained with reference to the flowchart of FIG. 8. It is presumed that the control unit 20*a* is currently the service system. First, the process for determining the loading factor is identical to the above-explained process (steps S301 to S303).

The security process is basically the same as the above-explained process (steps S304 to S308). However, after the completion of the security process on the control unit 20*b* that is the standby system, the abnormality determining unit 17*a* determines the presence/absence of an abnormality (step S309).

When an abnormality is found (step S309: NO), the alert output unit 17*b* outputs an alert (step S316). The alert displaying unit 33 in the operating-monitoring device 30 displays the received alert on the screen. The output device 10*b* of the security managing device 10 can also display the alert.

When no abnormality is found (step S309: YES) or after the alert is output, the change instructing unit 15 causes the service/standby system changing device 23 to change the standby system and the service system. Next, the security processing unit 13 performs the security process on the control unit 20*a* that has been changed to the standby system (steps S310 to S314).

After the completion of the security process on the control unit 20*a* that has been changed to the standby system, the abnormality determining unit 17*a* determines the presence/absence of an abnormality (step S315). When an abnormality is found (step S315: NO), the alert output unit 17*b* outputs an alert (step S317). The alert displaying unit 33 in the operating-monitoring device 30 displays the received alert on the screen. The output device 10*b* of the security managing device 10 can also display the alert.

When no abnormality is found (step S315: YES) or after the above-explained alert is output, the process is terminated.

[3. Advantage]

According to this embodiment, an operator of the plant can immediately recognize whether or not the control unit 20*a* or 20*b* in the plant control device 20 has caused an abnormality like a virus infection by an alert. Hence, the operator can deal with the abnormality immediately. The alerting can be performed through not only screen display but also flashing of a lamp or sound. In this case, the alert displaying unit 33 and the output device 10*b* may be a light emitting device or a sound output device.

[D. Fourth Embodiment]

[1. Configuration]

Figure 9:
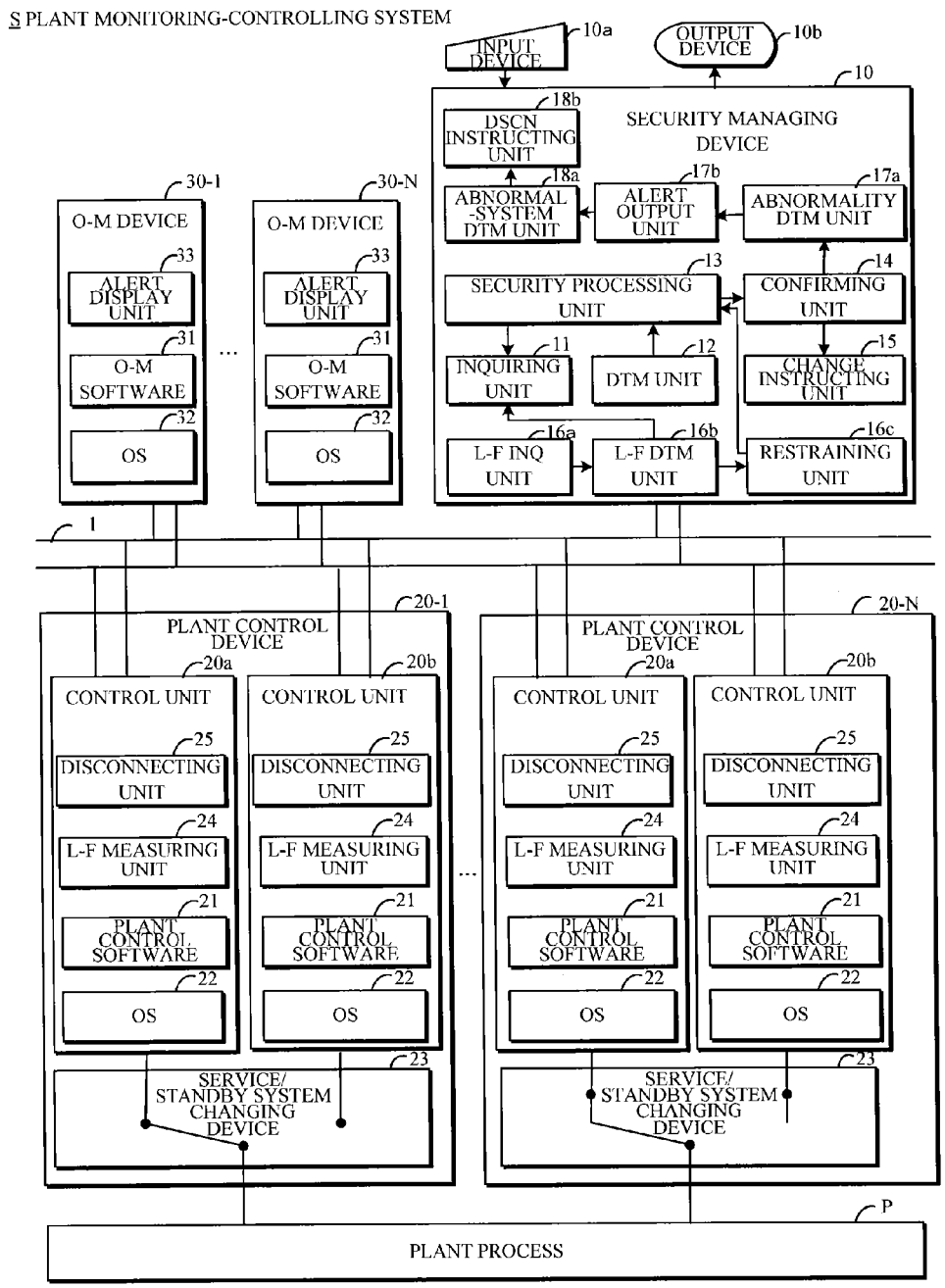
FIG. 9 is a block diagram illustrating an example configuration of a fourth embodiment.

A configuration according to this embodiment will be explained with reference to FIG. 9. The same configuration as those of the first to third embodiments will be denoted by the same reference numeral, and the duplicated explanation will be omitted.

First of all, the control units 20a and 20b in the plant control device 20 are individually provided with a disconnecting unit 25. The disconnecting unit 25 is a processing unit that disconnects the control unit 20a or 20b from the network 1. Example disconnecting processes are to close a connected port and to power off a router.

The security managing device 10 includes an abnormal-system determining unit (ABNORMAL-SYSTEM DTM UNIT) 18a and a disconnection instructing unit (DSCN INSTRUCTING UNIT) 18b. The abnormal-system determining unit 18a is a processing unit that determines whether the control unit 20a or 20b that has been determined as abnormal by the abnormality determining unit 17a is the service system or the standby system. The disconnection instructing unit 18b is a processing unit that instructs the disconnecting unit 25 to disconnect the line when the control unit 20a or 20b that has been determined as abnormal is the standby system.

[2. Action]

Figure 10:
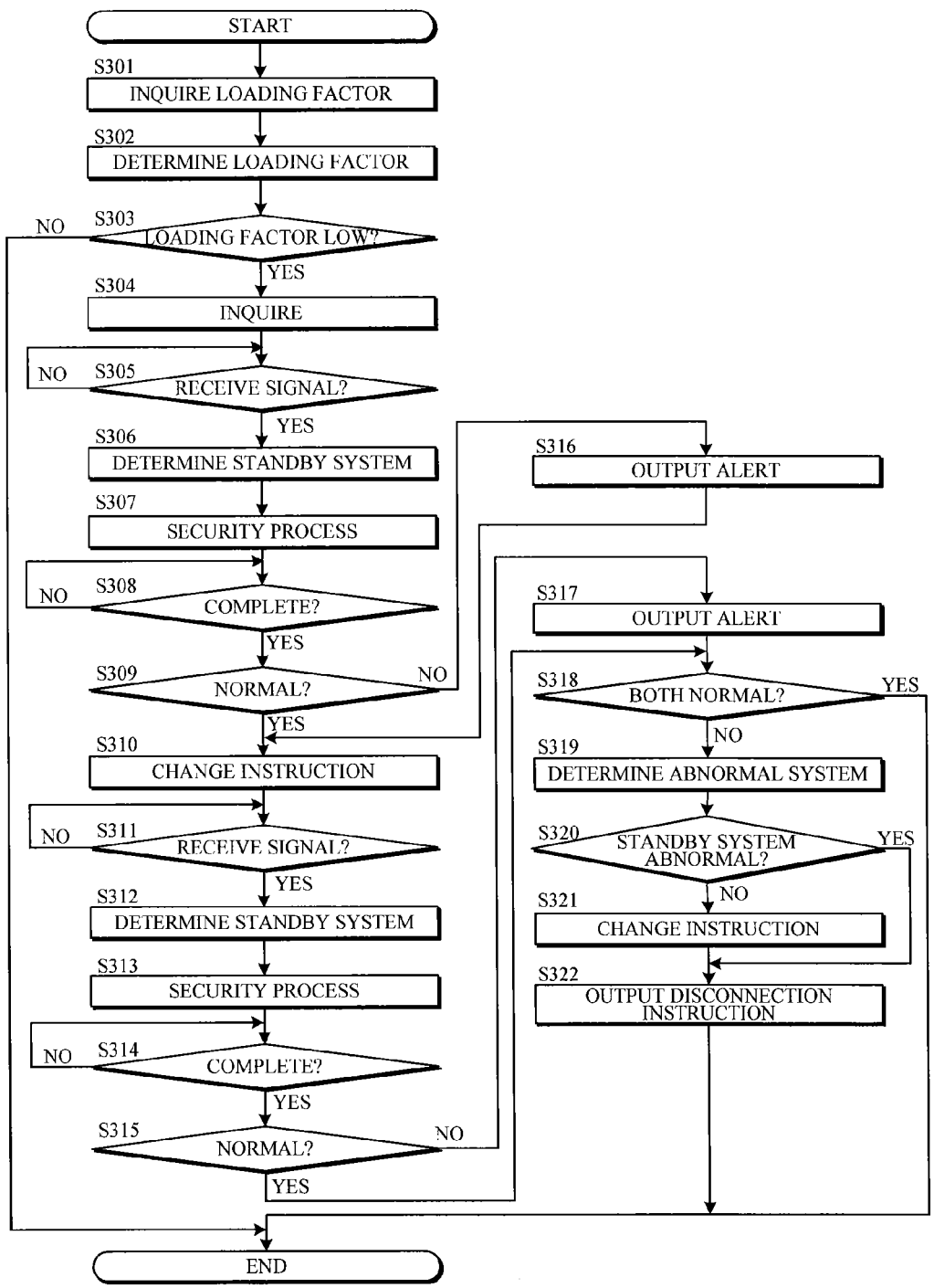
FIG. 10 is a flowchart illustrating a process flow according to the fourth embodiment.

A flow of the process according to this embodiment employing the above-explained configuration will be explained with reference to the flowchart of FIG. 10. The process according to this embodiment is basically the same as that of the third embodiment. It is presumed that the control unit 20a is the service system at first but the control unit 20b becomes the service system after a change.

First, after the above-explained security process (steps S301 to S317), when both of the control unit 20a and the control unit 20b are normal (step S318: YES), the process is terminated. Conversely, when both of or either one of the control units 20a and 20b is abnormal (step S318: NO), the abnormal-system determining unit 18a determines the soundness of the system.

That is, the abnormal-system determining unit 18a determines whether the control unit 20a or 20b causing an abnormality is currently the service system or the standby system (step S319). When such a control unit has caused an abnormality but is the standby system (step S320: YES), the disconnection instructing unit 18b outputs an instruction for disconnecting the standby system (step S322).

In this case, since the control unit 20a is currently the standby system, the disconnecting unit 25 of the control unit 20a that has received the disconnection instruction disconnects the control unit 20a from the network 1.

When the control unit that has caused an abnormality is the service system (step S320: NO), the change instructing unit 15 outputs a change instruction between the service system and the standby system (step S321). In this case, the service/standby system changing device 23 changes the control unit 20b to be the standby system.

Next, the disconnection instructing unit 18b outputs a disconnection instruction to the control unit 20b that has become the standby system (step S322). The disconnecting unit 25 of the control unit 20b that has received the disconnection instruction disconnects the control unit 20b from the network 1.

[3. Advantage]

According to this embodiment, the control unit 20a or 20b that is determined as abnormal through the security process can be disconnected from the network 1. When an abnormality like a virus infection occurs, the virus is basically cleaned through the security process. There is, however, a possibility that an abnormality not detected is present and it affects other devices, and thus a further detailed check for an abnormality is preferable in some cases. According to this embodiment, the control unit 20a or 20b that has caused an abnormality is set to be the standby system, and is disconnected. Hence, negative effects to the other devices can be suppressed. Moreover, the plant operation can be maintained by another control unit 20a or 20b.

[E. Fifth Embodiment]

[1. Configuration]

Figure 11:
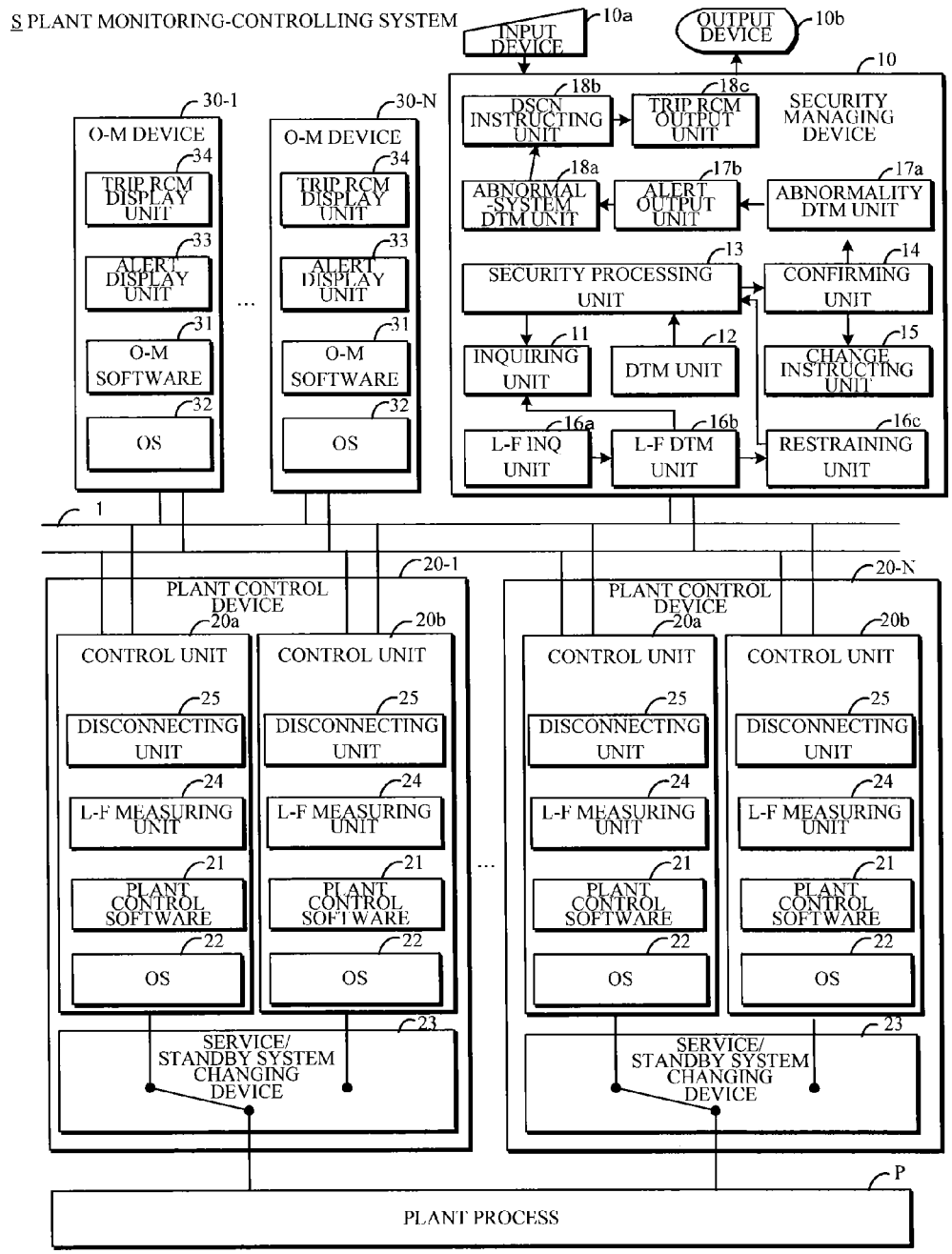
FIG. 11 is a block diagram illustrating an example configuration according to a fifth embodiment.

A configuration according to this embodiment will now be explained with reference to FIG. 11. The same configuration as those of the first to fourth embodiments will be denoted by the same reference numeral, and the duplicated explanation will be omitted.

First of all, the operating-monitoring device 30 includes a trip recommendation display unit (TRIP RCM DISPLAY UNIT) 34. The trip recommendation display unit 34 is a processing unit that displays a trip recommendation that is output by the security managing device 10. The trip recommendation prompts the user to select whether to continue the plant operation or to trip such an operation.

Next, the security managing device 10 includes a trip recommendation output unit (TRIP RCM OUTPUT UNIT) 18c. The trip recommendation output unit 18c is a processing device that outputs a trip recommendation to the operating-monitoring device 30 and the output device 10b when the abnormal-system determining unit 18a determines that both of the control units 20a and 20b which are the service system and the standby system are abnormal.

[2. Action]

Figure 12:
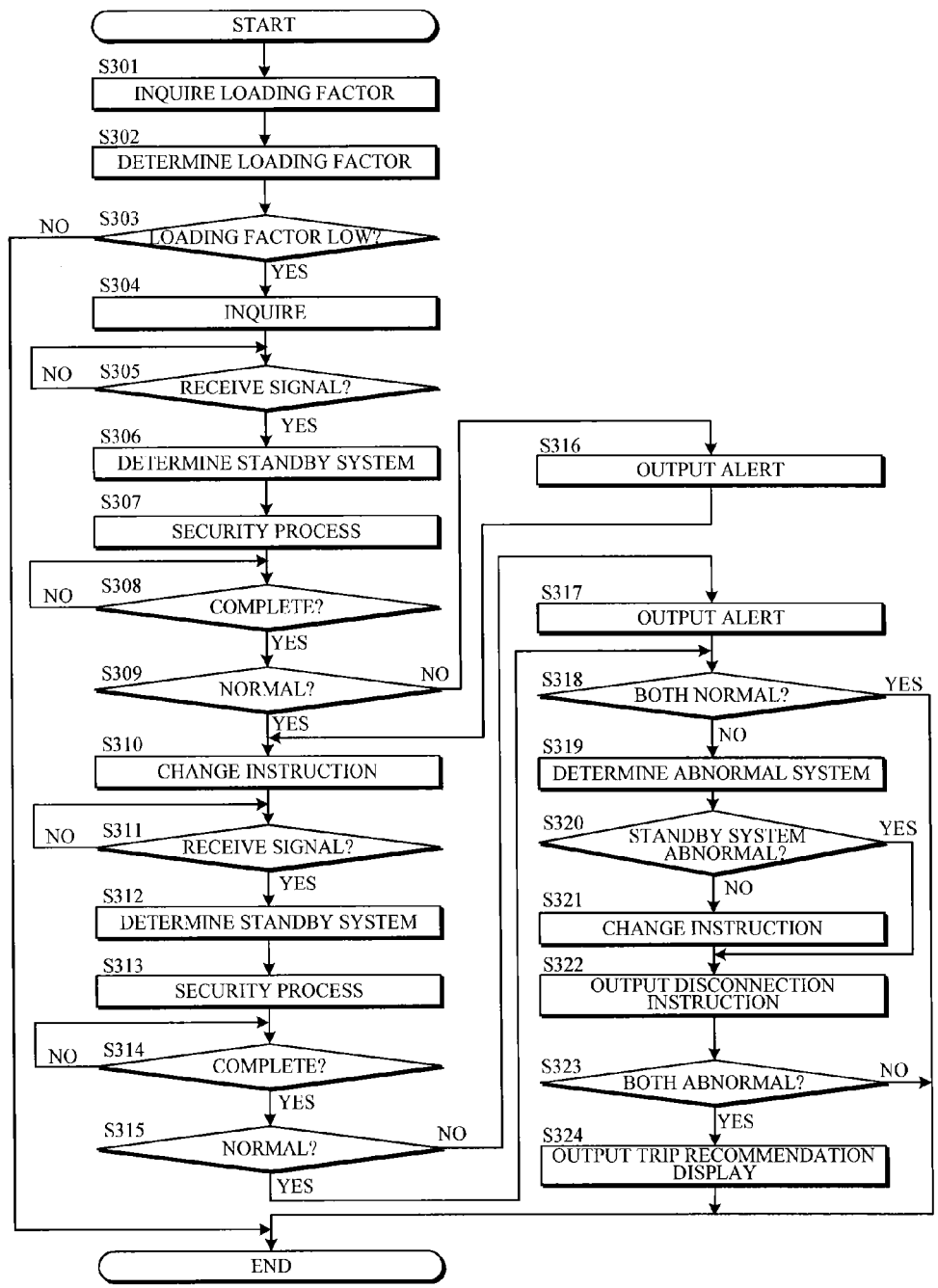
FIG. 12 is a flowchart illustrating a process flow according to the fifth embodiment.

A flow of the process according to this embodiment employing the above-explained configuration will be explained with reference to the flowchart of FIG. 12. The process according to this embodiment is basically the same as that of the fourth embodiment (steps S301 to S322).

When, however, the abnormal-system determining unit 18a determines that both service system and standby system are abnormal (step S323: YES), the trip recommendation output unit 18c outputs a trip recommendation (step S324).

In this case, the trip recommendation display unit 34 of the operating-monitoring device 30 and the output device 10b display the trip recommendation. When only either one of the service system and the standby system is determined as abnormal (step S323: NO), the process is terminated.

[3. Advantage]

According to this embodiment, when it is determined as abnormal through the security process, a display that prompts the operator to select whether to continue the plant operation or to trip such an operation. Hence, the operator can determine the necessity of the continuation of the plant operation, and select a trip, etc., thereby suppressing a reduction of the reliability and an occurrence of an accident in advance.

[F. Sixth Embodiment]

[1. Configuration]

Figure 13:
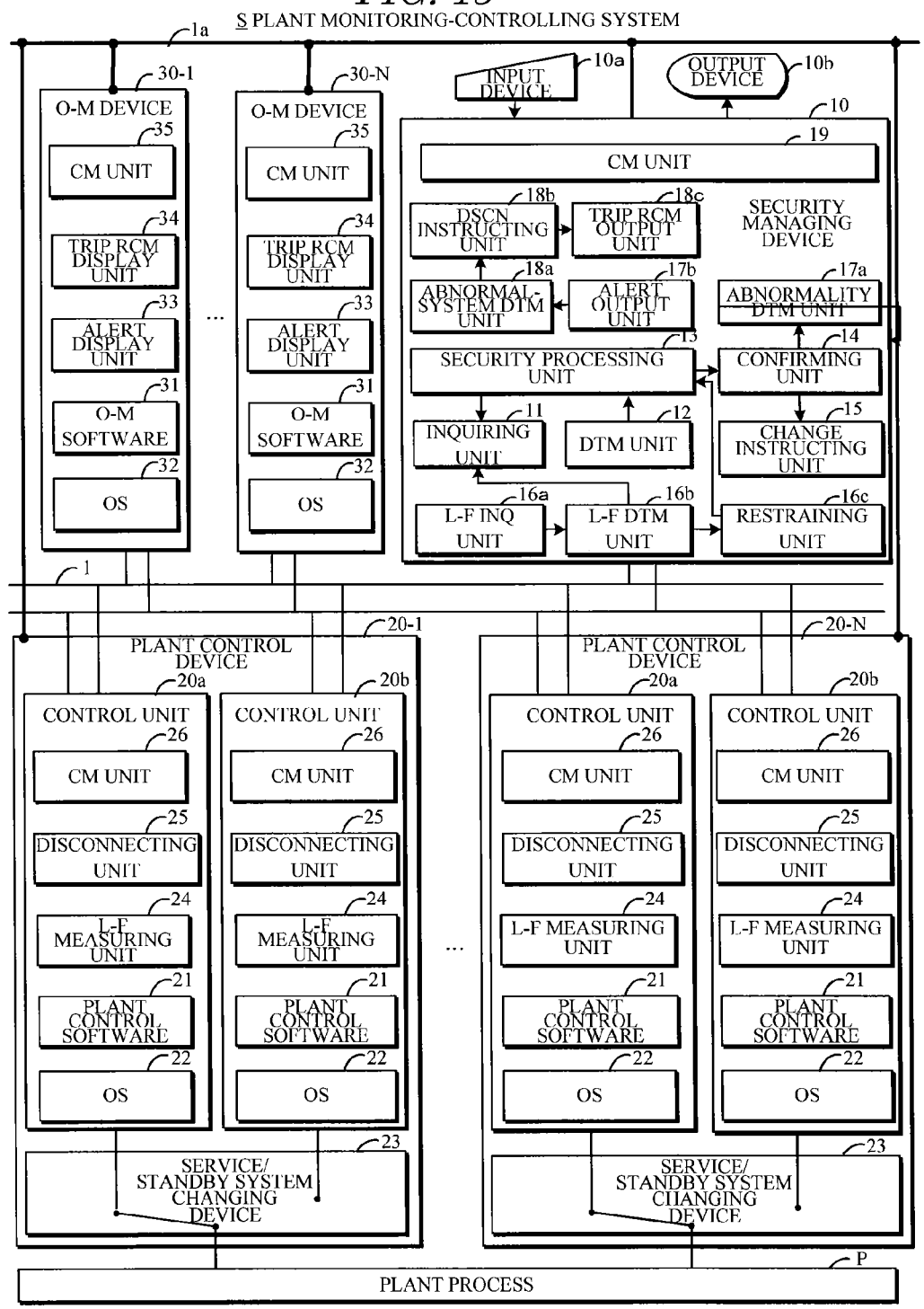
FIG. 13 is a block diagram illustrating an example configuration according to a sixth embodiment.

A configuration according to this embodiment will now be explained with reference to FIG. 13. The same configuration as those of the first to fifth embodiments will be denoted by the same reference numeral, and the duplicated explanation will be omitted. That is, the security managing device 10 of this embodiment includes a communication unit (CM UNIT) 19. Moreover, the operating-monitoring device 30 and the control units 20a and 20b of the plant control device 20 also include respective communication units 35 and 26.

The security managing device 10, the operating-monitoring device 30 and the control units 20a and 20b of the plant control device 20 are connected to a security-process exclusive network 1a independent from the network 1 through the communication units 19, 35, and 26.

[2. Action and Advantage]

According to the above-explained embodiment, the security process that is the same as the above-explained security process can be performed through the network 1a which is different from the network 1 used for operating-monitoring and controlling the plant. Hence, the security process can be performed under an environment that facilitates the security to be ensured in comparison with the network 1. This makes it possible to easily ensure the continuous operation of the plant. For example, it is possible to prevent a virus from entering at the time of the security process, and data for the security process does not interfere with the traffic through the network 1 for the plant control.

[G. Seventh Embodiment]

[1. Configuration]

Figure 14:
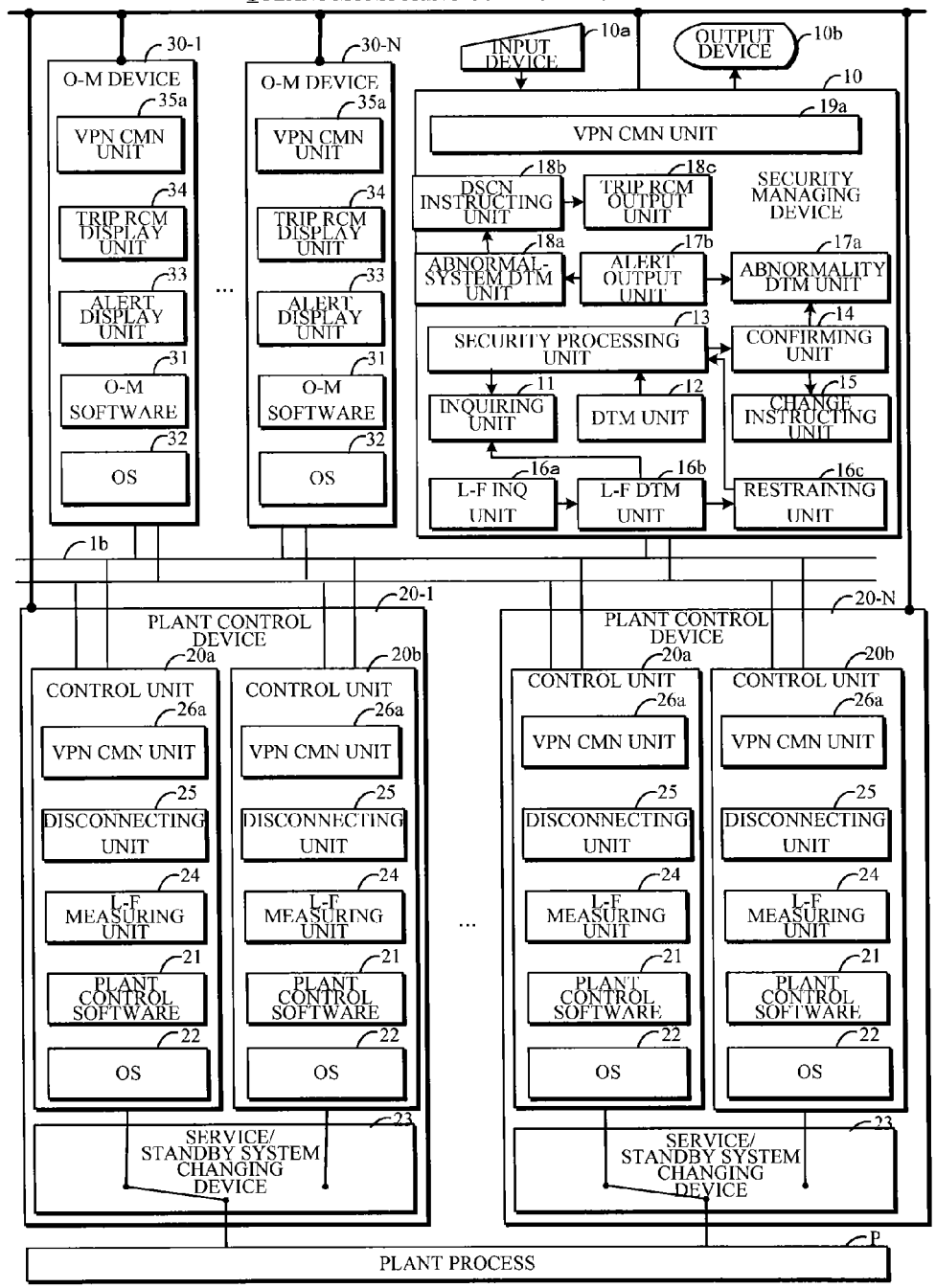
FIG. 14 is a block diagram illustrating an example configuration according to a seventh embodiment.

A configuration according to this embodiment will now be explained with reference to FIG. 14. The same configuration as those of the first to fifth embodiments will be denoted by the same reference numeral, and the duplicated explanation will be omitted. That is, the security managing device 10 of this embodiment includes a VPN communication unit (VPN CMN UNIT) 19a. Moreover, the operating-monitoring device 30 and the plant control device 20 also include VPN communication units 35a and 26a, respectively.

The security managing device 10 and the control units 20a and 20b of the plant control device 20 are provided in such a manner as to be capable of transmitting/receiving signals through a VPN (Virtual Private Network) 1b independent from the network 1 by respective VPN communication units 19a, 35a, and 26a.

[2. Action and Advantage]

According to the above-explained embodiment, the security process can be performed not only by simply utilizing a separate network from the network 1 but also the VPN 1b. Hence, the security process can be performed under an environment that ensures a further higher security through encapsulation and encryption, etc. This makes it possible to easily ensure the continuous operation of the plant.

[H. Eighth Embodiment]

Figure 15:
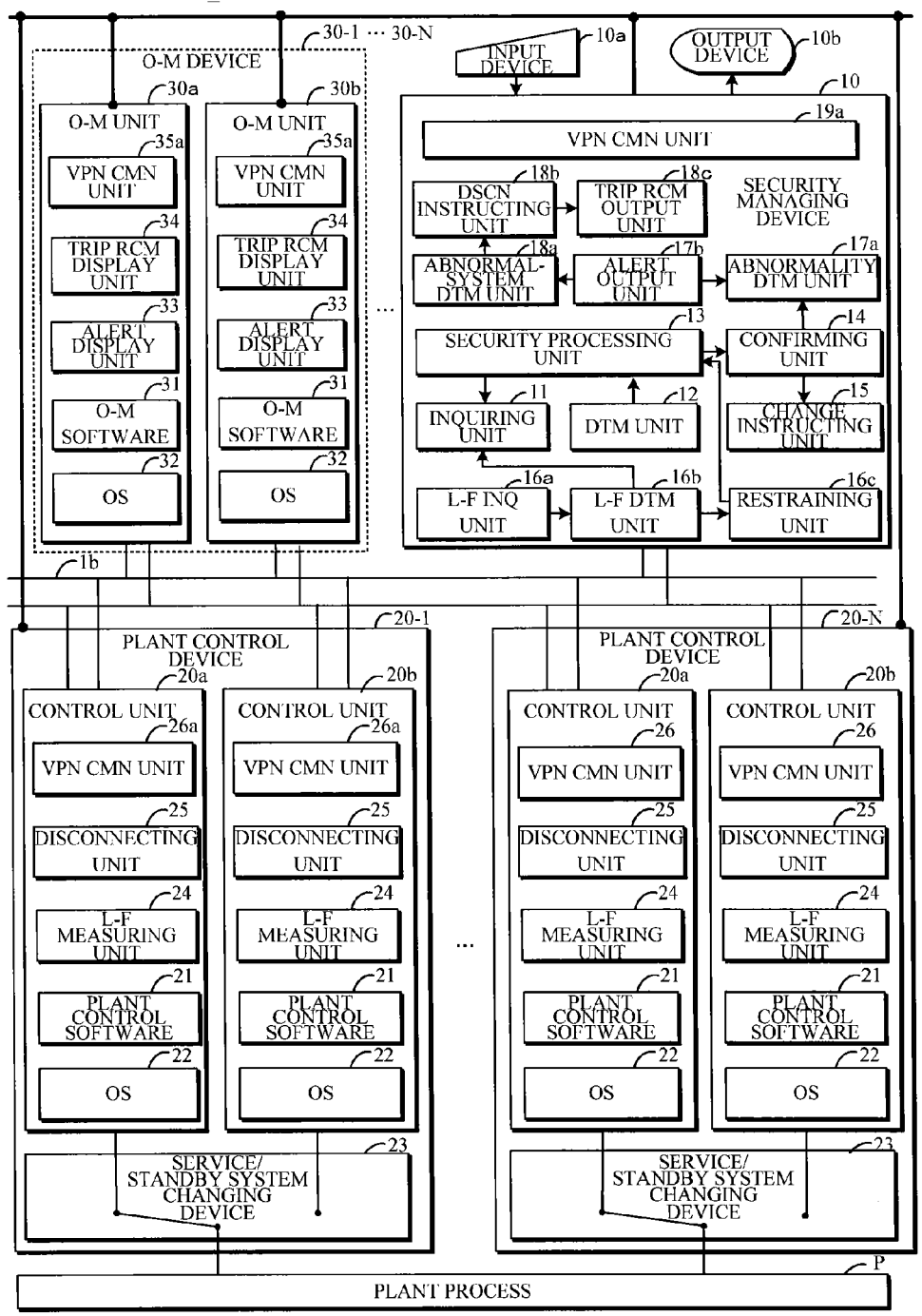
FIG. 15 is a block diagram illustrating an example configuration according to an eighth embodiment.

A configuration of this embodiment will now be explained with reference to FIG. 15. The same configuration as those of the first to seventh embodiments will be denoted by the same reference numeral, and the duplicated explanation will be omitted. First of all, the operating-monitoring device 30 includes operating-monitoring units (O-M UNIT) 30a and 30b that are multiplex elements relating to the plant monitoring and control. The two operating-monitoring units 30a and 30b are, for example, computers having respective CPUs independent from each other. The operating-monitoring units 30a and 30b are changeable between the service system and the standby system.

Next, respective units of the security managing device 10 of this embodiment performs the process that is the same as the process performed on the control units 20a and 20b in the plant control device 20 on the operating-monitoring units 30a and 30b. Hence, regarding the operating-monitoring device, also, a detection of an abnormality and a rapid coping when an abnormality is detected are enabled while the operating-monitoring device maintains the normal operation, and the same action and advantage as those of the above-explained embodiments can be accomplished. The changing may be carried out through the operation mode change of each of the operating-monitoring units 30a and 30b, and may be carried out through a change in the connection with the network 1b by the communication device.

[I. Other Embodiments]

(1) The number of the plant control devices and that of the operating-monitoring devices subjected to the security process according to the above-explained embodiments are not limited to the particular number. Setting can be freely made whether or not to perform the security process on any of the plurality of plant control devices and operating-monitoring devices. Moreover, the number of the control units and that of the operating-monitoring units that are multiplex elements may be equal to or greater than three. In this case, setting can be also freely made for in what order the security process is performed on the control units and the operating-monitoring units that are the standby systems, and for in what order such control units and operating-monitoring units are changed to be the service system. Respective units in the above-explained embodiments may be implemented by a common computer or may be implemented by a plurality of computers connected together via a network.

(2) The network connected in the above-explained embodiments broadly includes a channel (a transmission line) that can exchange information. All kinds of transmission media regardless of a wireless or a wired manner are applicable as such a channel, and it is optional through what kind of LAN or WAN the information is propagated and whether such information is propagated through or not through such a network. All kinds of communication protocols available presently or in future are applicable for the communication. All kinds of devices which transmit/receive information through a network and which are available presently or in future are applicable.

(3) Specific contents and values of information according to the above-explained embodiments are optional, and are not limited to a specific content and a numerical value. In the above-explained embodiments, it is optional whether a large or small determination for a value and a determination for a consistency/inconsistency, etc., include a determination-target value in the meaning of "equal to or greater than" and "equal to or smaller than", or exclude the determination-target value in the meaning of "greater than" and "smaller than".

(4) While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A plant security managing device comprising a computer, the computer comprising:

circuitry configured to perform as a determining unit that determines which one of elements multiplexed as an element of a service system and an element of a standby system associated with monitoring and controlling of a plant is the standby system;

a security processing unit that performs a security process only on the element of the standby system; and a change instructing unit that outputs an instruction for changing the element of the standby system and the element of the service system with each other;

a loading-factor determining unit that determines whether or not a loading factor of the element of the service system between the multiplexed elements exceeds a predetermined threshold; and a restraining unit that restrains the security process by the security processing unit on the element of the standby system in accordance with a determination result by the loading-factor determining unit.

2. The plant security managing device according to claim 1, wherein the security processing unit comprises:

a detector that detects a security abnormality in the element of the standby system; and an eliminator that eliminates the abnormality detected by the detector.

3. The plant security managing device according to claim 1, further comprising circuitry configured to perform as:

an abnormality determining unit that determines whether or not the element has an abnormality through the security process by the security processing unit; and an alert output unit that outputs an alert when the abnormality determining unit determines that there is an abnormality.

4. The plant security managing device according to claim 1, wherein the plant security managing device is connected to the multiplexed elements through a network, and the plant security managing device further comprises circuitry configured to perform as:

an abnormality determining unit that determines whether or not the element has an abnormality through the security process by the security processing unit; and a disconnection instructing unit that outputs an instruction for disconnecting the element determined as abnormal by the abnormality determining unit from the network.

5. The plant security managing device according to claim 1, further comprising circuitry configured to perform as:

an abnormality determining unit that determines whether or not the element has an abnormality through the security process by the security processing unit; and a trip recommendation output unit that outputs a display for prompting a selection whether to continue a plant operation or to trip the plant operation when the abnormality determining unit determines that there is an abnormality.

6. The plant security managing device according to claim 1, wherein the plant security managing device is connected to the multiplexed elements through a network independent from a network used for monitoring and controlling a plant.

7. The plant security managing device according to claim 6, wherein the independent network is a VPN.

8. A plant security managing method causing a computer or an electronic circuit to execute:

a process of a determining which one of elements multiplexed as an element of a service system and an element of a standby system associated with monitoring and controlling of a plant is the standby system;

a security process on the element of the standby system;

a process of outputting an instruction for changing the element of the standby system and the element of the service system with each other after a completion of the security process; and a security process on the element of the standby system after the change;

a determining process that determines whether or not a loading factor of the element of the service system between the multiplexed elements exceeds a predetermined threshold; and a restraining process that restrains the security process on the element of the standby system in accordance with a determination result by the loading-factor determining process.

9. A computer readable non-transitory recording medium having stored therein a plant security managing program that causes a computer to execute:

a process of a determining which one of elements multiplexed as an element of a service system and an element of a standby system associated with monitoring and controlling of a plant is the standby system;

a security process on the element of the standby system;

a process of outputting an instruction for changing the element of the standby system and the element of the service system with each other after a completion of the security process; and a security process on the element of the standby system after the change;

a determining process that determines whether or not a loading factor of the element of the service system between the multiplexed elements exceeds a predetermined threshold; and a restraining process that restrains the security process on the element of the standby system in accordance with a determination result by the loading-factor determining process.

* * * * *